United States Patent [19]

Osborne

[11] Patent Number: 4,699,684

[45] Date of Patent: Oct. 13, 1987

[54] LASER SEALING SYSTEM

[75] Inventor: William E. Osborne, Whittier, Calif.

[73] Assignee: Shelburne Family Trust, Fresno, Calif.

[21] Appl. No.: 732,579

[22] Filed: May 9, 1985

Related U.S. Application Data

[63] Continuation of Ser. No. 555,672, Nov. 28, 1983, abandoned.

[51] Int. Cl.$^4$ .......................... B27G 11/02; B31F 5/04
[52] U.S. Cl. ............................... 156/379.6; 156/272.8; 219/121 LA; 219/121 LC; 118/620; 493/135
[58] Field of Search .................. 219/121 LS, 121 LT, 219/121 LP, 121 LQ, 121 LC, 121 LE, 121 LR, 121 LA; 493/133, 135, 121, 128, 129; 156/272.6, 272.8, 379.6, 359, 556; 118/620

[56] References Cited

U.S. PATENT DOCUMENTS 3,997,270 12/1976 Suzuki .................................. 356/385
4,330,699 5/1982 Farrow ......................... 219/121 LD

FOREIGN PATENT DOCUMENTS 0073692 6/1978 Japan ............................. 219/121 LT

OTHER PUBLICATIONS

Muncheryan, *Fundamentals & Applications*, pp. 14–15.
Osborne, *Electronics*, "Long Range Infrared Intruder Alarm . . . ", 11-20-72, pp. 111–113.

*Primary Examiner*—Donald E. Czaja
*Assistant Examiner*—Merrell C. Cashion, Jr.

[57] ABSTRACT

Herein described is apparatus for sealing cartons and containers, which includes using a laser beam directed at critical areas on the carton or container for inducing constant heat upon the area of a carton or container passing in front of the beam. Further described is a beam splitting system which splits the laser beam to direct it to different areas on the container being sealed or to different cartons simultaneously.

3 Claims, 3 Drawing Figures

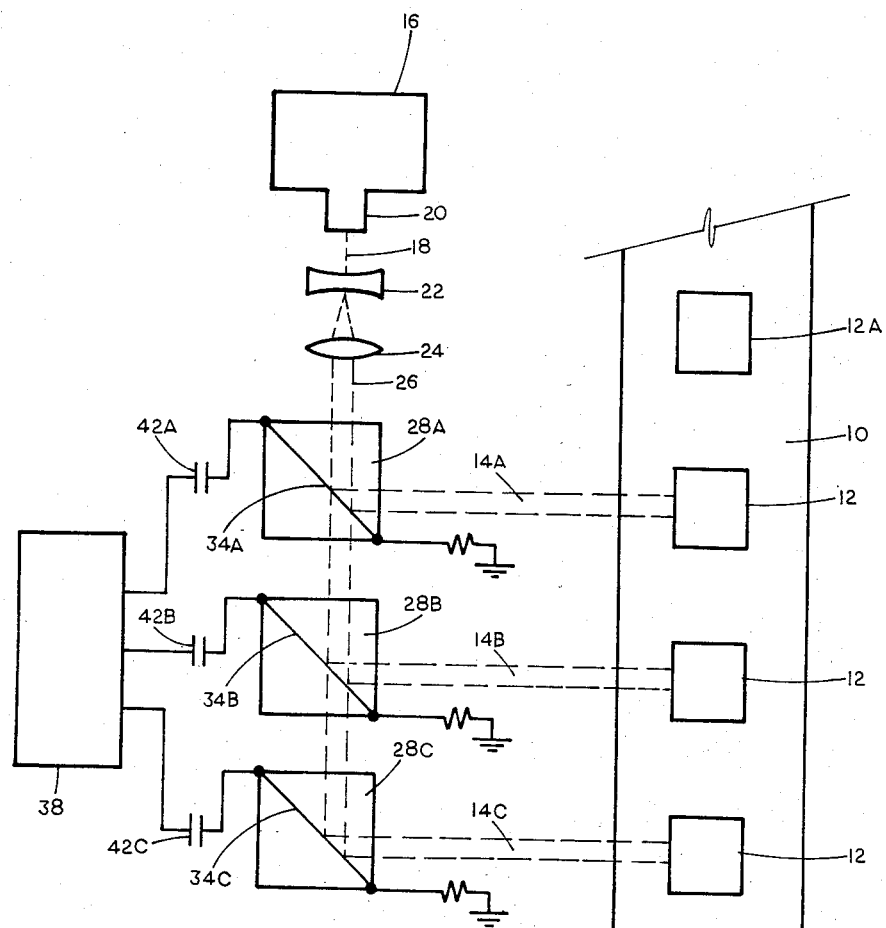
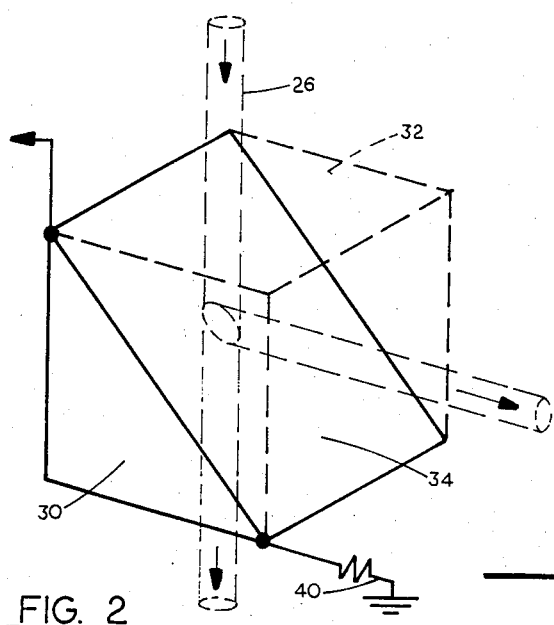
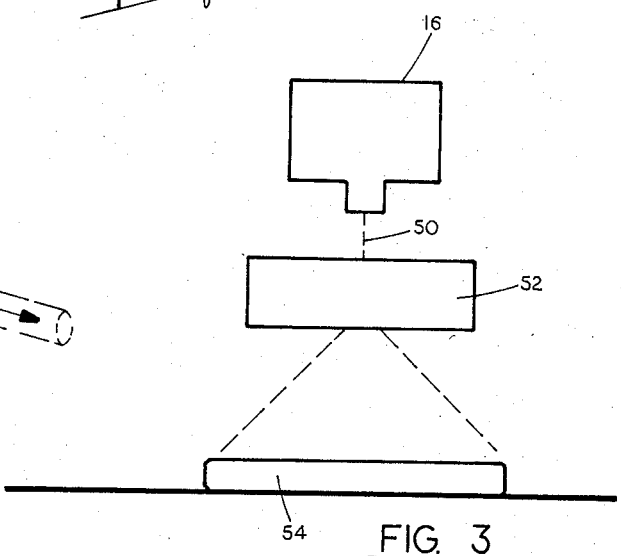

LASER SEALING SYSTEM

REFERENCE TO CO-PENDING APPLICATION

This application is a continuation of application Ser. No. 555,672 filed Nov. 11, 1983, now abandoned to William E. Osbourne for Laser Sealing Systems.

BACKGROUND

This invention relates to packaging apparatus and methods of doing the same and more particularly to a novel and improved high-speed carton, container and packaging heat sealing method using well known laser technology with unique combinations of apparatus to increase the speed and efficiency of the sealing technique.

PRIOR ART

Heretofore the equipment used in carton, package and container sealing have included the use of a "hot wire" (an electrical element usually inside a cathode or other external sheath) which is lightly applied to packages as they travel along a conveyor belt. The packages already have applied thereto a sealing substance (such as a polyethylene or similar coating). The sealing substance is then heated to provide an effective seal.

The speed of the work product on the conveyor belt varies according to the bulk and shape of the product, but is known to operate at a speed of 100 items per minute. Another method of prior art packaging sealing at yet still higher speeds is the use of a plurality of natural gas jets used on cartons, for example, milk cartons. With the gas jets replacing the electrical elements, speeds of up to 2,000 per minute have been found possible. However, the use of natural gas jets suffers in efficiency because of the necessity of frequent cleaning and adjustments.

BACKGROUND OF THE INVENTION

Lasers and masers have been in use for many years and the techniques and many useful purposes are well known. The present invention makes use of these well known techniques for a new and unique part of the structure described herein—basically the use of laser in the packaging and cartoning industry. By use of the laser in the following combination permits an enormous increase in speed at which packages are sealed while reducing the energy consumed. Also, the system of the present invention provides a cleaner operation and greatly reduced costs.

Using the laser beam to seal packages has not heretofore been accomplished in the packaging and cartoning industry. However, it has been discovered that the laser beam, if properly applied as set forth in the present invention using in combination with the hereinafter described structure and method a unique and very useful safe, economical, and clean packaging and cartoning high-speed sealing system has been ascertained.

BRIEF DESCRIPTION

Briefly described, the present invention includes a laser beam which may be defocused and broadened by a variable collimator and convex lens adjusted to the predetermined beam width means are included so that the desired work product, such as a package or carton having the desired sealing substance previously applied thereto, passes in close proximity to the beam so that sufficient heat from the beam causes the sealing substance to heat. Beam splitting means may be included whereby the laser beam can be effectively split to create multiple sealing beams for sealing different work products (or locations on the same work products) simultaneously.

Further, there has been developed a laser beam splitting technique for reflecting a portion of the beam in a different direction to accommodate simultaneously sealing cartons or sealing a single carton at different locations.

DESCRIPTION OF THE DRAWINGS

These and other features and advantages will become more apparent to those skilled in the art when taken into consideration with the following detailed description where like reference numeral to indicate line and corresponding parts throughout the several views and wherein:

FIG. 1 is a schematic drawing of one embodiment of the present invention showing multiple sealing arrangements providing a sealing beam of one thickness with divergence and power control.

FIG. 2 is a somewhat schematic drawing showing the reflective direction of the two-prism doped cube.

FIG. 3 is a schematic drawing of the present invention using an optical scanner.

DESCRIPTION OF THE SHOWN EMBODIMENTS

A carton to be sealed is generally coated in the area to be sealed with a sealing substance. Various substances may be used to create the seal; however, more recently polyethylene is the most widely used. The description hereinafter set forth directs its attention mainly to a system and method using basically a laser beam to seal a polyethylenecoated carton such as a milk carton.

Turning to FIG. 1, the numeral 10 generally indicates a conveyor belt which carries cartons 12 in sealing communication with the sealing beams 14a, 14b and 14c. Basically the cartons 12a are in an unsealed state when first introduced onto the conveyor belt 10 and leave the conveyor belt 10 in a sealed condition as a carton 12b.

The carton 12 is generally sealed in a number of different positions, depending upon the configuration and the contents thereof. For this particular embodiment, the device is shown as sealing a milk carton.

To generate the laser beam, a standard laser 16 of a type well known in the art is directed from a laser head 20 through lenses 22 and 24 to create a collimated beam. The beam is passed through prisms 28a, 28b and 28c where part of the beam is reflected towards the cartons 12 on the conveyor 10 at pre-selected locations for causing heat to be disbursed on the sealant on the carton causing it to seal. Mechanisms (not shown) can be used to cause the cartons 12 to turn, turn over or generally take different positions so that sealing can be accomplished at different positions within a single carton 12. Further, the step of finally filling the carton with a substance, such as milk in the case of a milk carton, prior to the final seal.

In order to accomplish the beam splitting techniques a unique prism method has been developed and depicted by the numeral 28 in FIG. 1. Basically two prisms are used having the desired reflection angle as may be shown in FIG. 2 whereby one prism 30 shown in solid line drawing and a second prism 34 the collimated beam 26 diverges upon the reflective surface 34 and a part thereof is reflected in the desired direction as the beam and a portion passes through to the next prism. To achieve the partial reflection a balsam cement which is used to affix the prisms 30 and 32 together is coated on the reflective surface 34 causing the adherence thereof. To effect the reflection the cement is doped with a mixture of barium-strontium titanates to control the reflective characteristics of the beam as it converges upon the reflective surface 34. It has been found that by applying microwave energy from a microwave generator 38 to the doped balsam cemented surface 34, the other end of which is coupled to a ground 40, the reflectiveness of the surface can be varied by varying the intensity of the energy from the microwave generator 38. The cubes 28 may be consisting of two prisms 30 and 32 of N-type germanium and the doped balsam cement is doped with about 0.01 of 1% to 0.9 of 1% barium-strontium-titanates.

The microwave transmitter 38 may be of a very low power (0.1 W) and be capacitively coupled through capacitors 42a, b and c to the balsam coating 34. The wavelength of the energy from the microwave generator is a subharmonic of the laser wavelength and if laser 16 is of the $CO_2$ type, the laser has a wavelength of $10.6\mu$. The control wavelength would thereof be approximately 106 microns (10th subharmonic) or 0.106 millimeters. The optical characteristics of the germanium and balsam allow power control of each beam. Germanium cuts off below 40 microns and therefore is not affected by the $106\mu$ control transmission. However, the doped balsam will pass this transmission and, due to harmonic relationship, the laser beam can be attenuated by a phase change of the microwave transmitter 38.

The doping affects the Curie point of the balsam cement, as the barium-strontium mixture is finely ground, die pressed and sintered. The sintering causes some strontium atoms to migrate to the barium crystal structure and this in turn affects the infared properties of the balsam in the 75–150 micron portion of the spectrum.

Referring bach to prisms 28a, 28b and 28c of FIG. 1, there is shown a collimated 3 beam 14a, 14b and 14c arrangement which each is capable of sealing up to one-half ($\frac{1}{2}$) inch wide seams on the item 12 being sealed. The laser beam 18 from the laser tube 20 is collimated and expanded to do this by use of the bi-concave lens 22 and the bi-convex lens 24 whereby the beam is diverging when striking lens 24 and is parallel when striking cube 28a the coating on the reflective surface 34a is one-third ($\frac{1}{3}$) reflective so that $33\frac{1}{3}\%$ is reflected towards the conveyor belt 10 and subsequently the items 12 thereon. The remaining two-thirds ($\frac{2}{3}$) of the beam strikes the cube 28b, which is 50% reflective so that one-half ($\frac{1}{2}$) of the remaining beam is reflected towards conveyor belt 10 and items 12 thereon and the other one-half ($\frac{1}{2}$) of the beam strikes cube 28c, each one-half ($\frac{1}{2}$) of the remaining beam reflects one-third ($\frac{1}{3}$) of the original beam. The remaining one-third ($\frac{1}{3}$) of the beam is completely deflected by the prism 34c which is 100% reflective and directed to the conveyor belt 10.

FIG. 3 illustrates a laser sealing apparatus which might be useful for use on flat packages such as plastic type bags and comprises a laser 16 which directs a beam 50 onto an optical scanner 52. The flat item 54 to be sealed passes under the optical scanner and creates a seal on the item 54 and predetermined locations.

While there has been shown in somewhat schematic form apparatus for sealing cartons and containers, it should be understood that existing structure has already been developed for conveying the item to be sealed in positions for sealing. That is to stand the item up, turn the item over or vertically place it in any desired position. Therefore, these mechanisms and mechanical structures have purposely been omitted from this disclosure.

Therefore, having shown but certain selected embodiments of this invention, what is claimed is:

1. Apparatus for sealing objects such as cartons and containers coated with sealant material comprising:
   a conveyer for passing a plurality as said objects into position to be heat sealed;
   a laser for generating a laser beam of predetermined intensity;
   a plurality of reflective means, each said reflective means being disposed in the path of said beam, whereby a portion of the beam is reflected by each reflective means in a directive to impinge upon the objects to be sealed on said conveyor and a portion of said beam is passed through to the next successive reflective means;
   each said reflective means includes a transparent cube comprised of N-type germanium having two prisms each having matching reflective surfaces and including a coating of balsam cement doped with approximately 0.01 of 1% to 0.9 of 1% barium-strontium-titanates; means coupled to said reflective means for causing and varying the reflectivity of said reflective means;
   said means for causing and varying the reflectivity of the reflective surfaces including a microwave transmitter coupled to the balsam cement surface coated on said reflective surface.

2. The Apparatus as defined in claim 1 and further including means disposed between said laser and said reflective means in the path of the laser beam to defocus and broaden said beam.

3. The apparatus as defined in claim 2 wherein said means for defocusing and broadening the beam a variable collimator and convex lense.

* * * * *